Feb. 4, 1936. A. P. STEINER ET AL 2,029,511
HYDRAULIC BALL RACE GRINDER
Filed Oct. 22, 1929 15 Sheets-Sheet 14

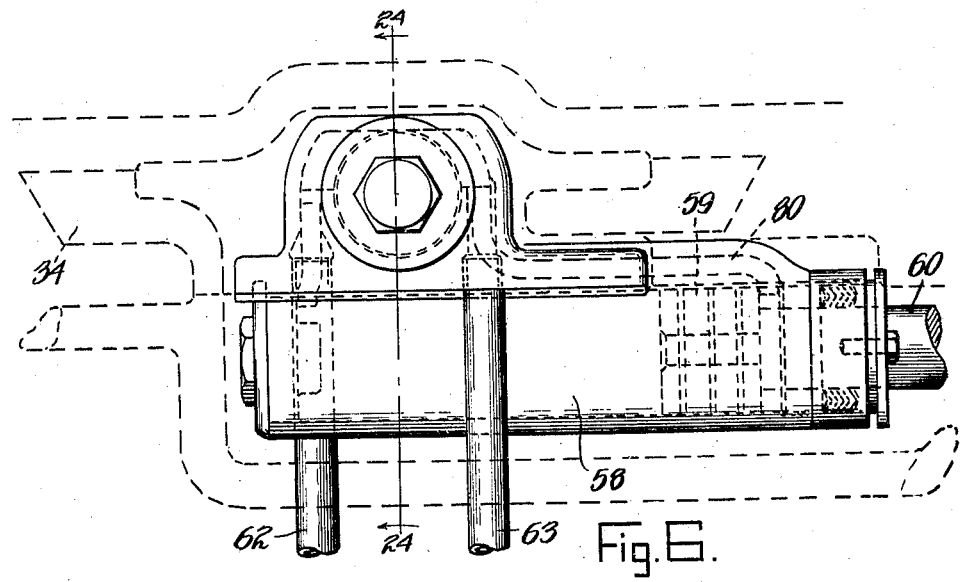
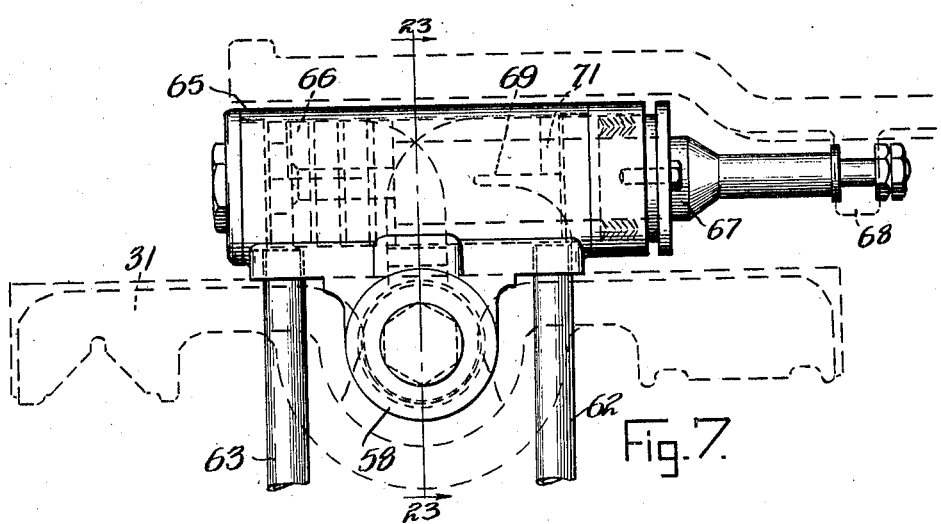

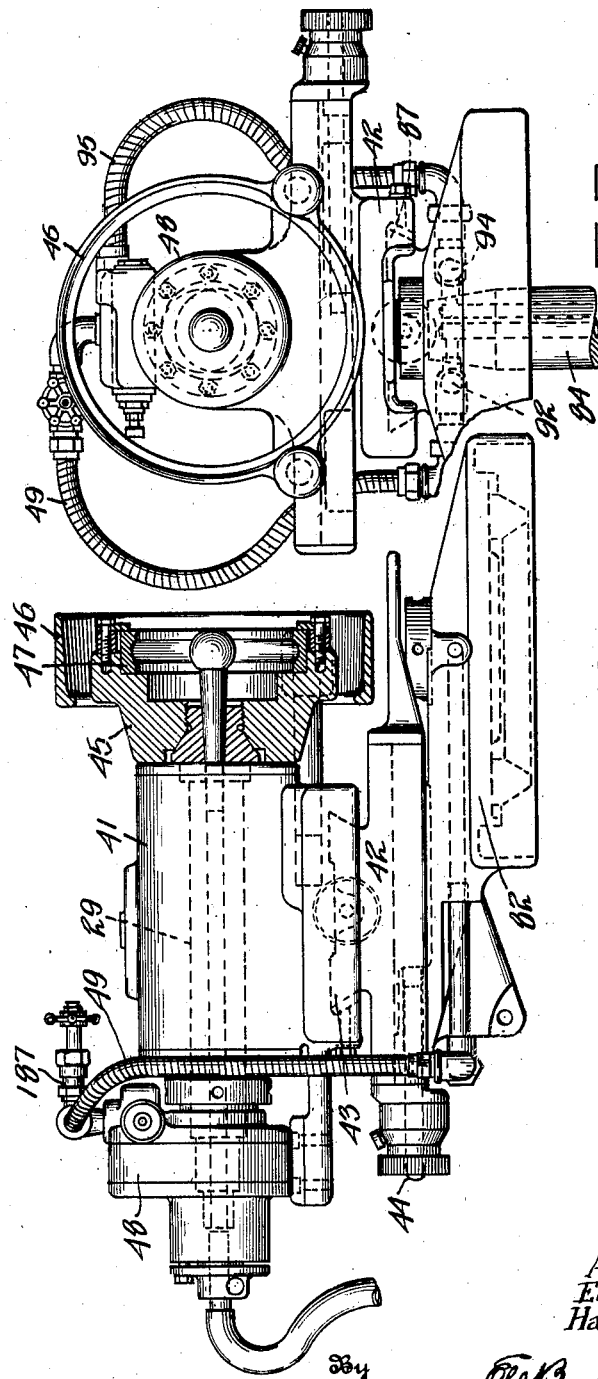

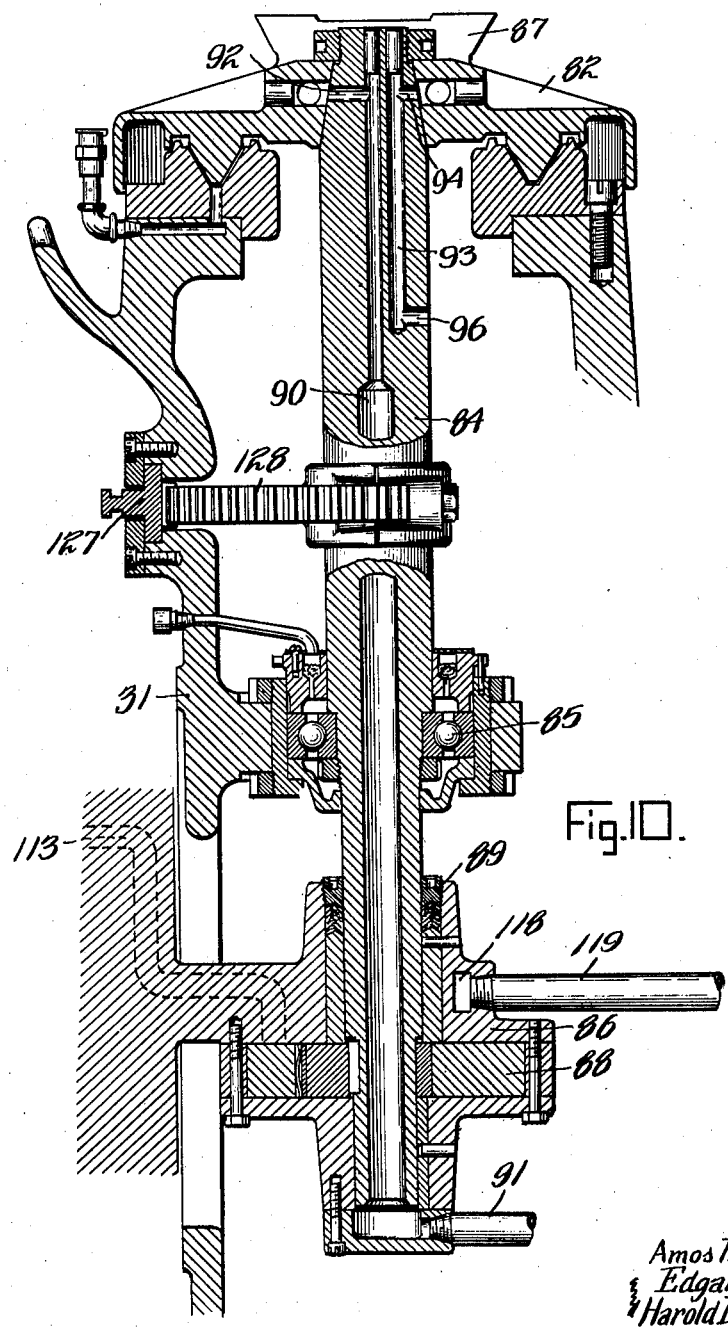

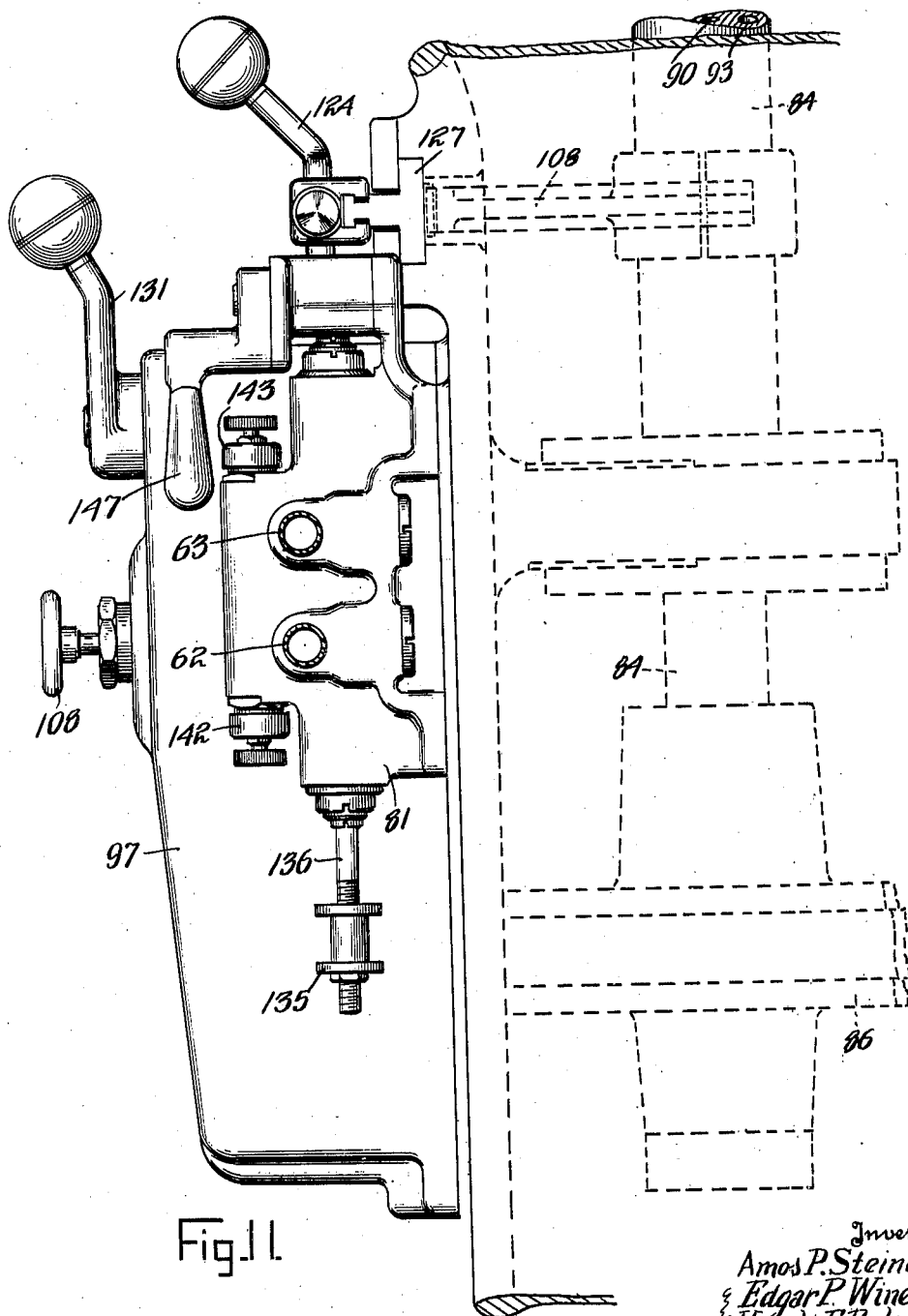

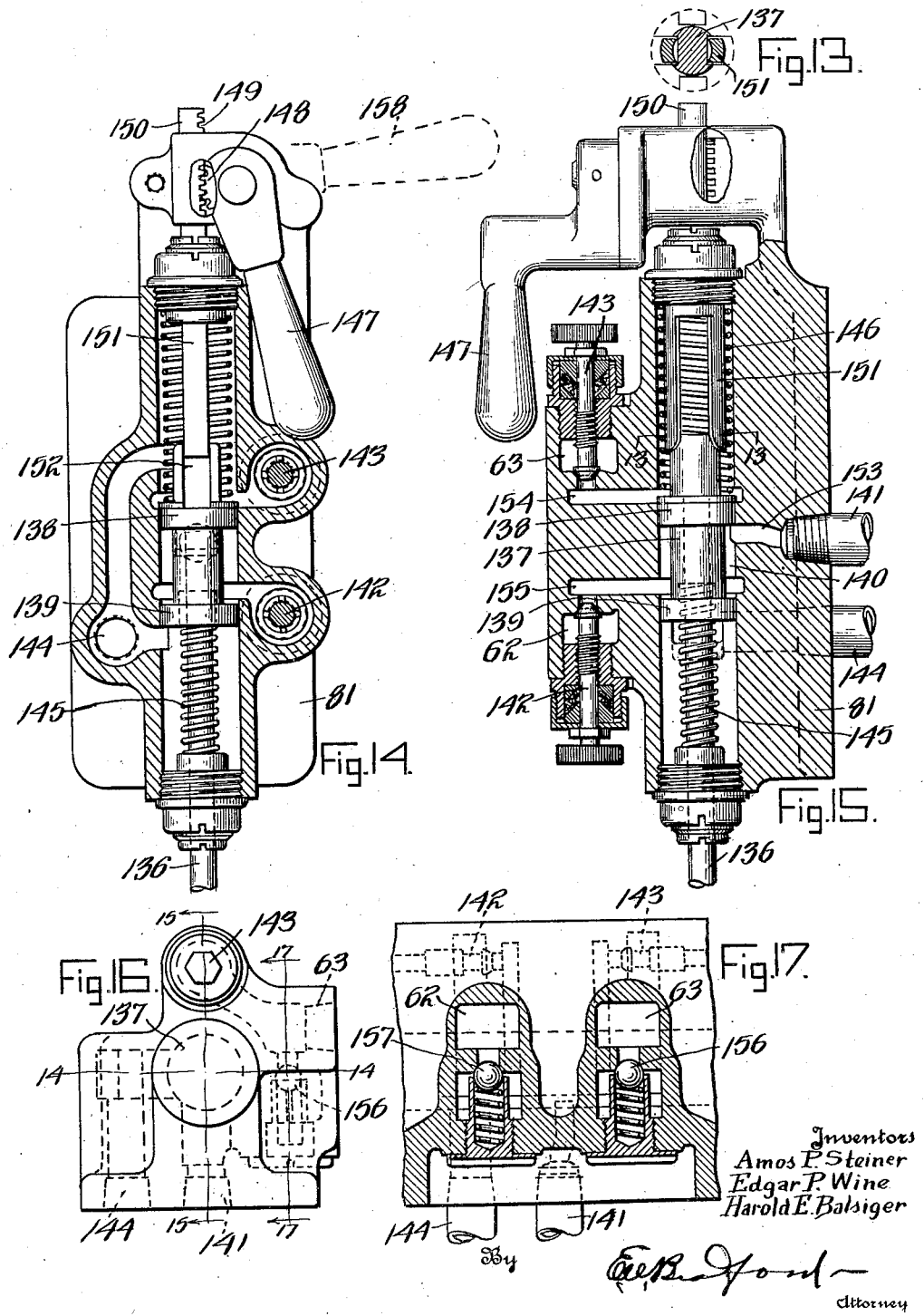

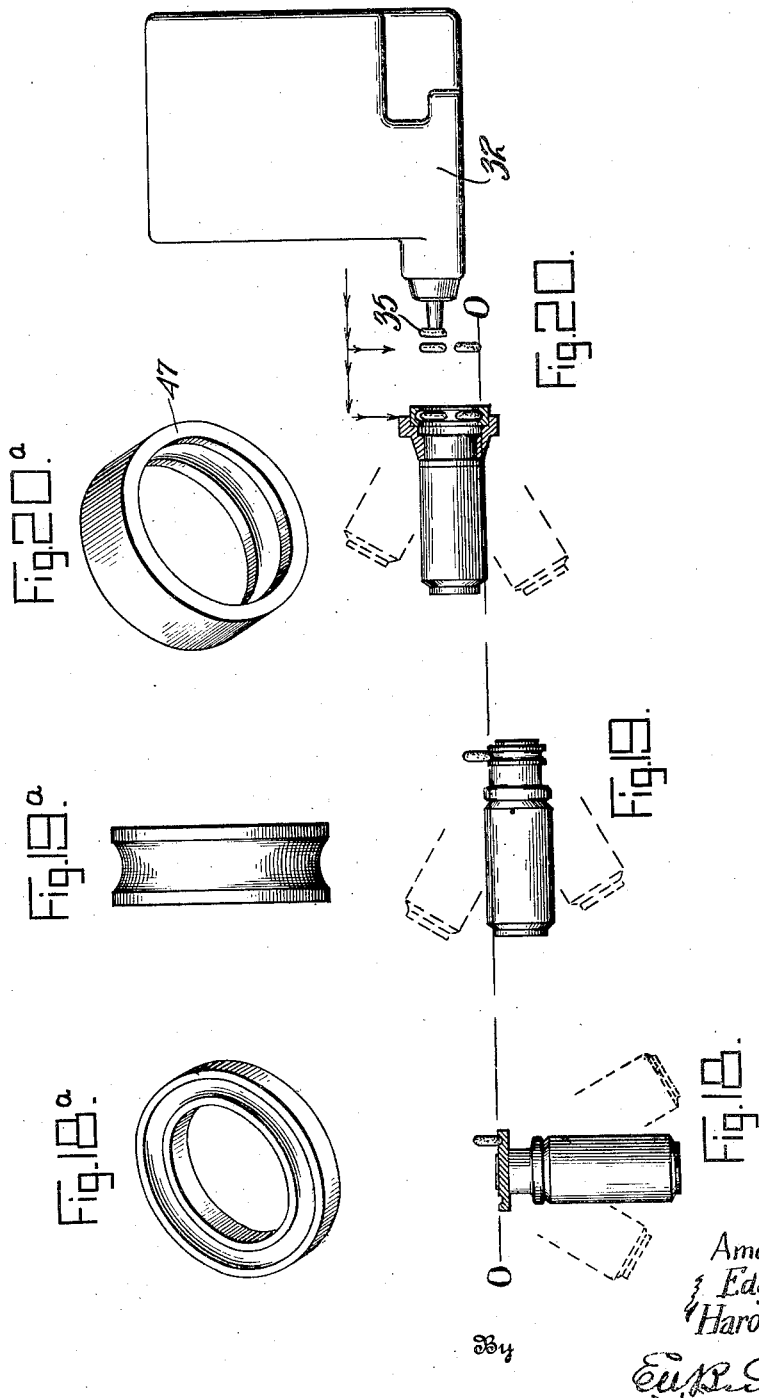

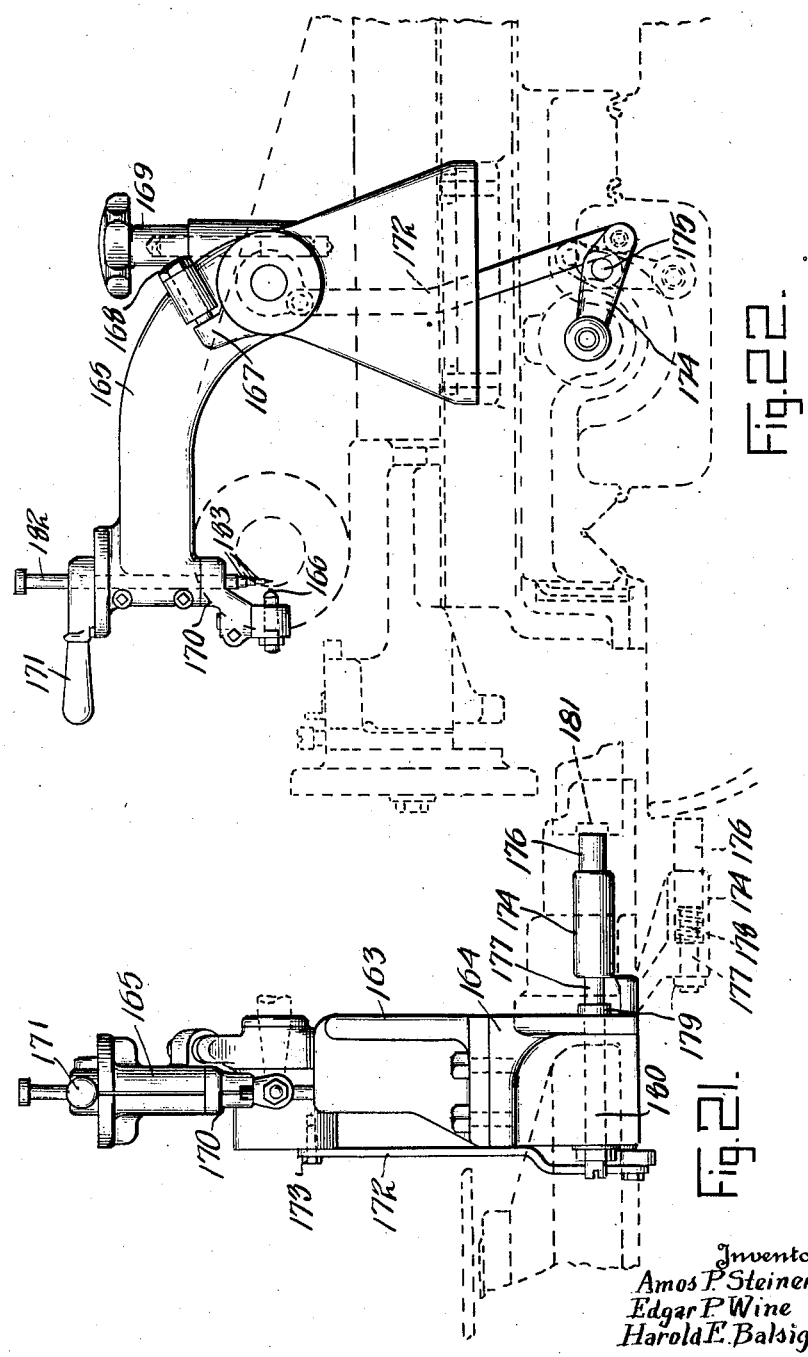

Inventors
Amos P. Steiner
Edgar P. Wine
Harold E. Balsiger
By
Attorney

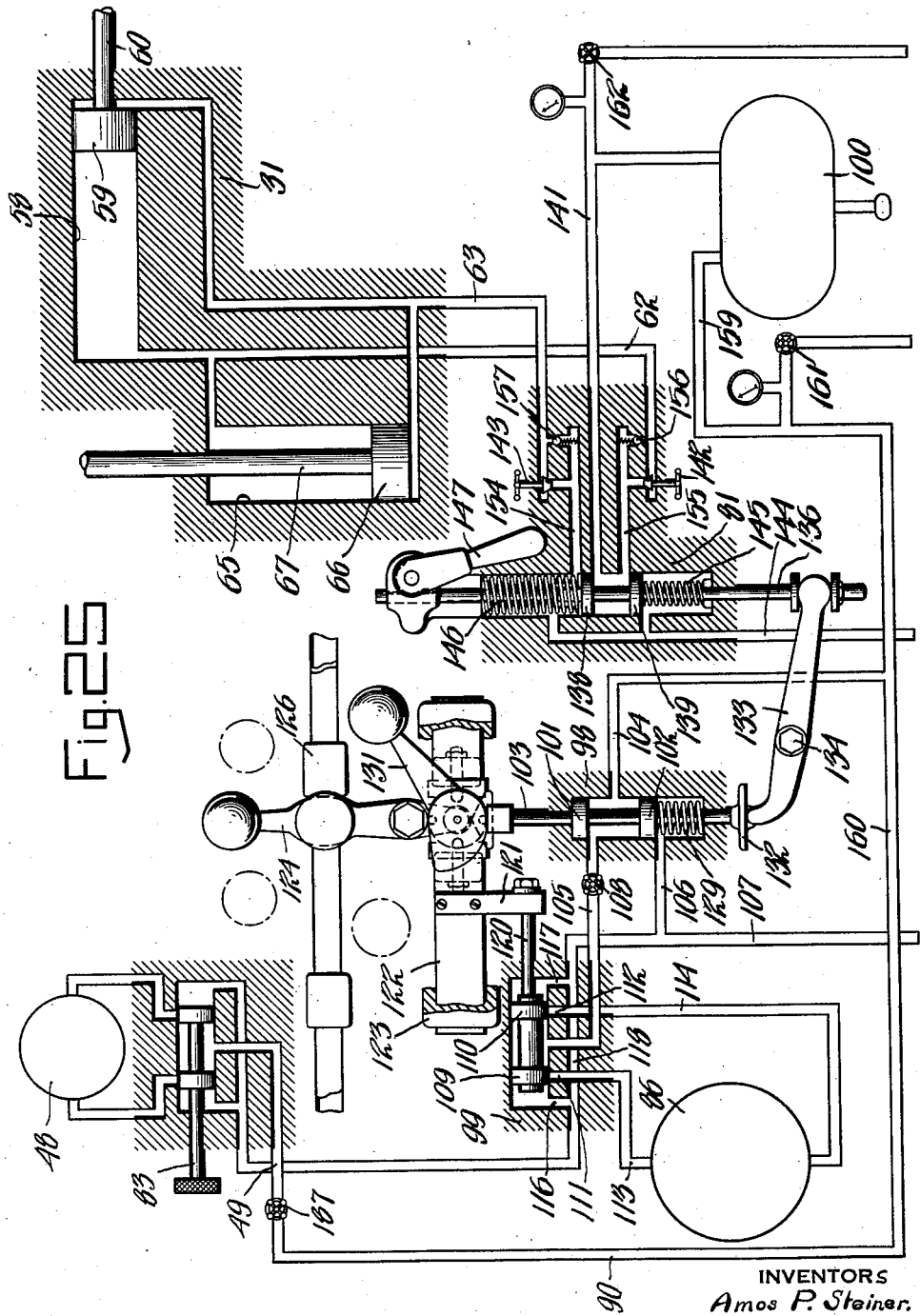

Patented Feb. 4, 1936

2,029,511

UNITED STATES PATENT OFFICE 2,029,511

HYDRAULIC BALL RACE GRINDER

Amos P. Steiner, Edgar P. Wine, and Harold E. Balsiger, Waynesboro, Pa., assignors to Landis Tool Company, Waynesboro, Pa., a corporation of Pennsylvania Application October 22, 1929, Serial No. 401,500

16 Claims. (Cl. 51—97)

This invention relates to grinding machines and more particularly to a grinding machine which is utilized for grinding internal surfaces in which the diameter of the surface to be ground is greater than the diameter of the opening through which the tool must be passed to reach the surface.

An object of the invention is to provide an efficient means for oscillating the head stock wherein the operating parts are few in number and free from any lost motion in their operation.

A further object of the invention is to provide a machine of the above type wherein the head stock is oscillated by a means whereby the rate of oscillation and the extent of oscillation may be adjusted independently one of the other.

A still further object of the invention is to provide a machine of the above type wherein the means which positions the grinding wheel for its grinding operation may be independently controlled for positioning the same for dressing.

Further objects and advantages will become apparent as the description proceeds.

Figure 1:
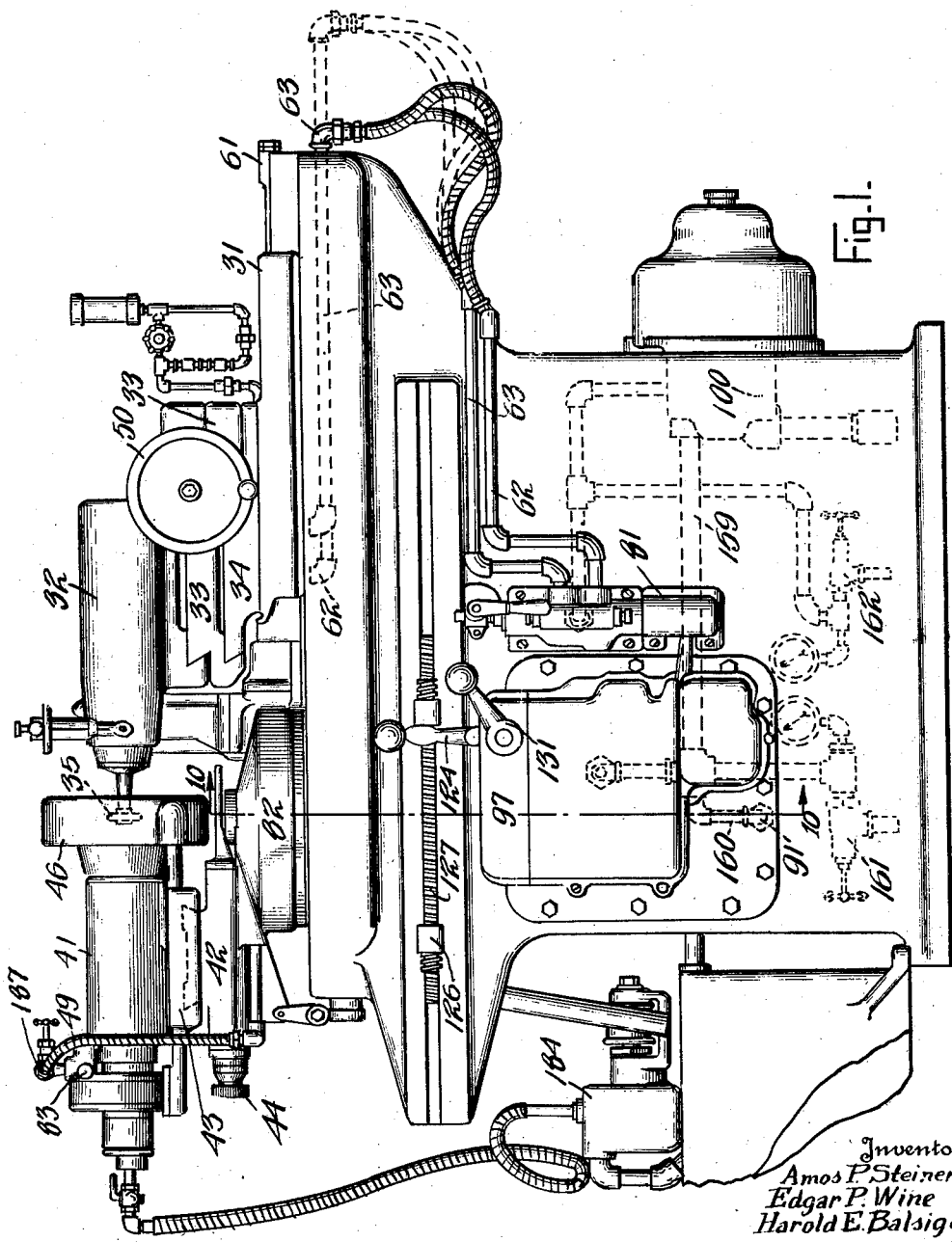
Figure 2:
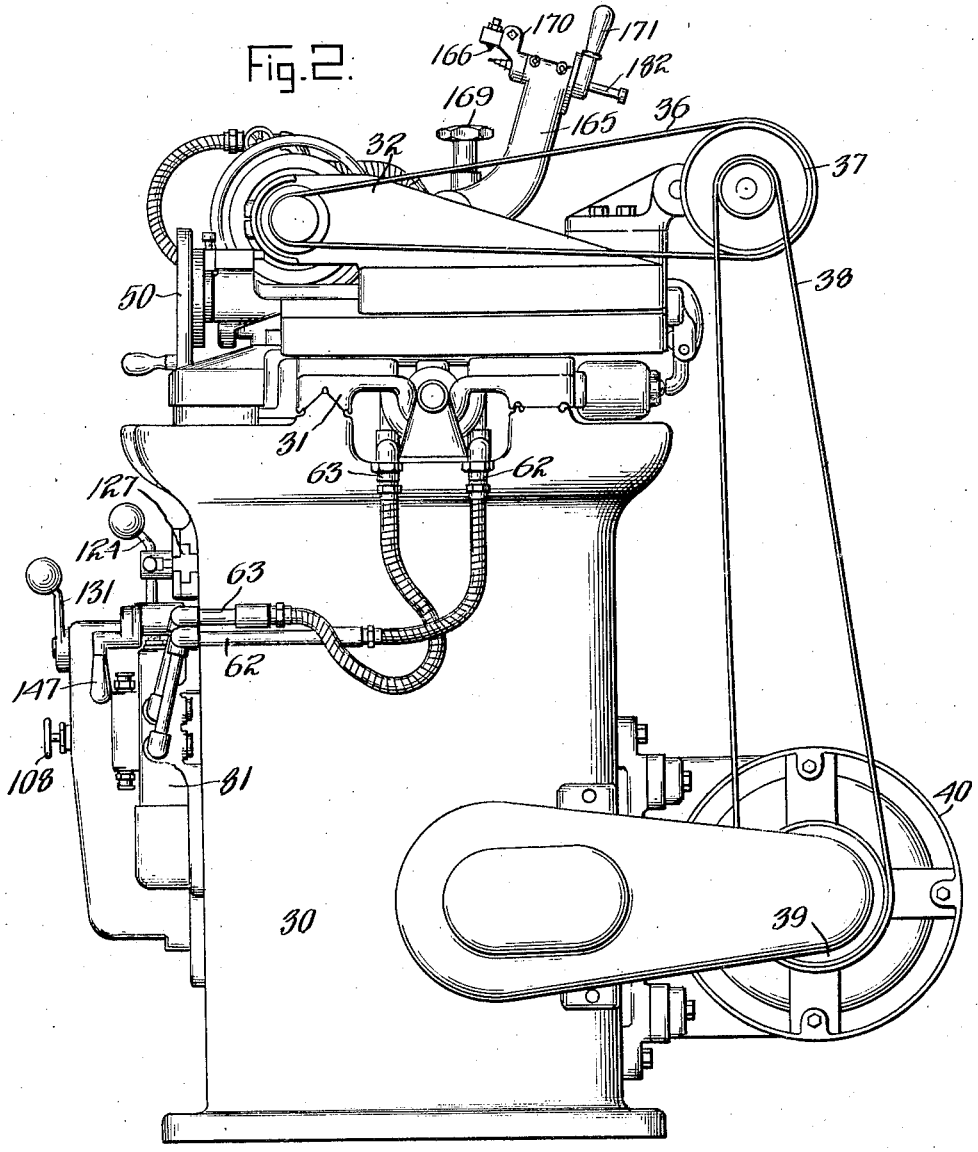
Figure 3:
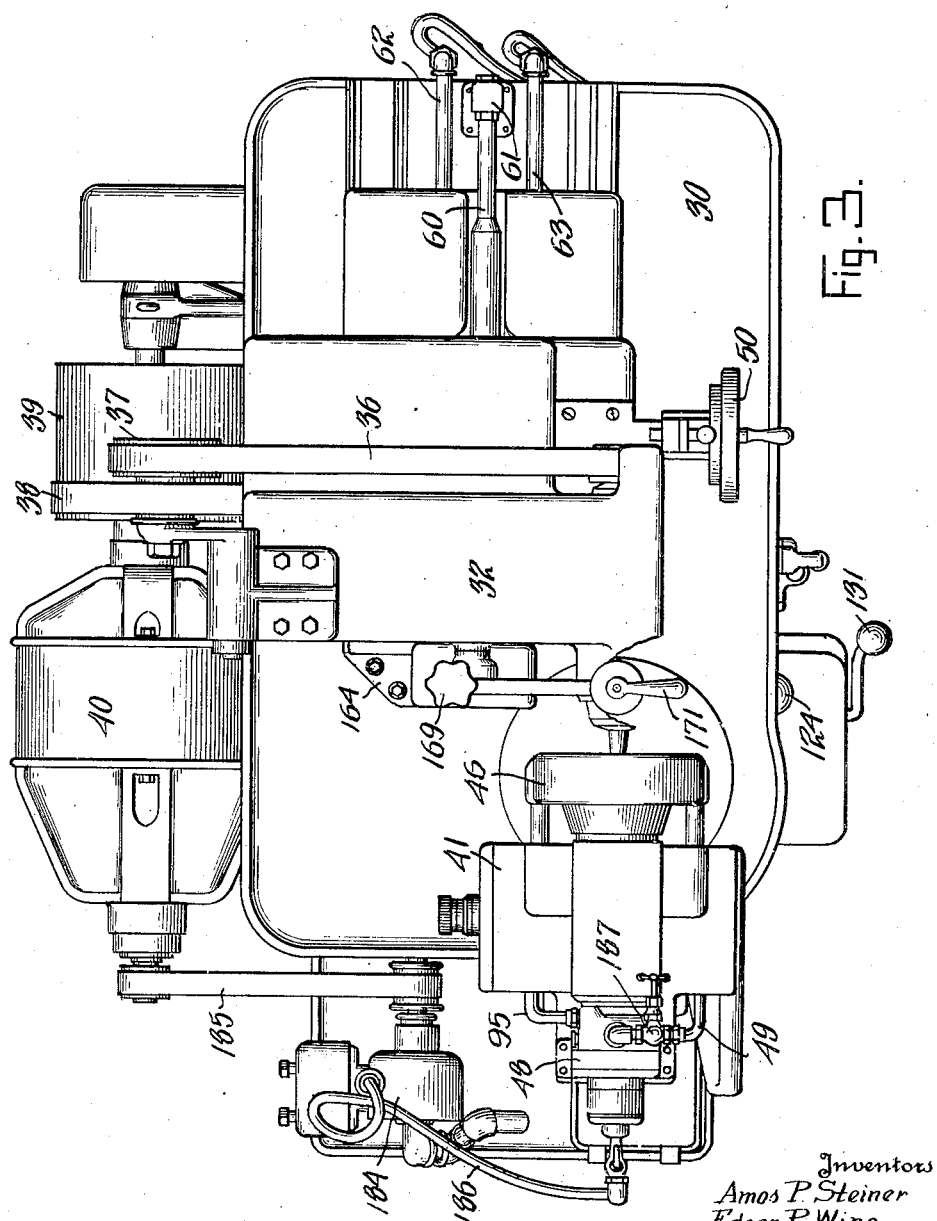
Figure 4:
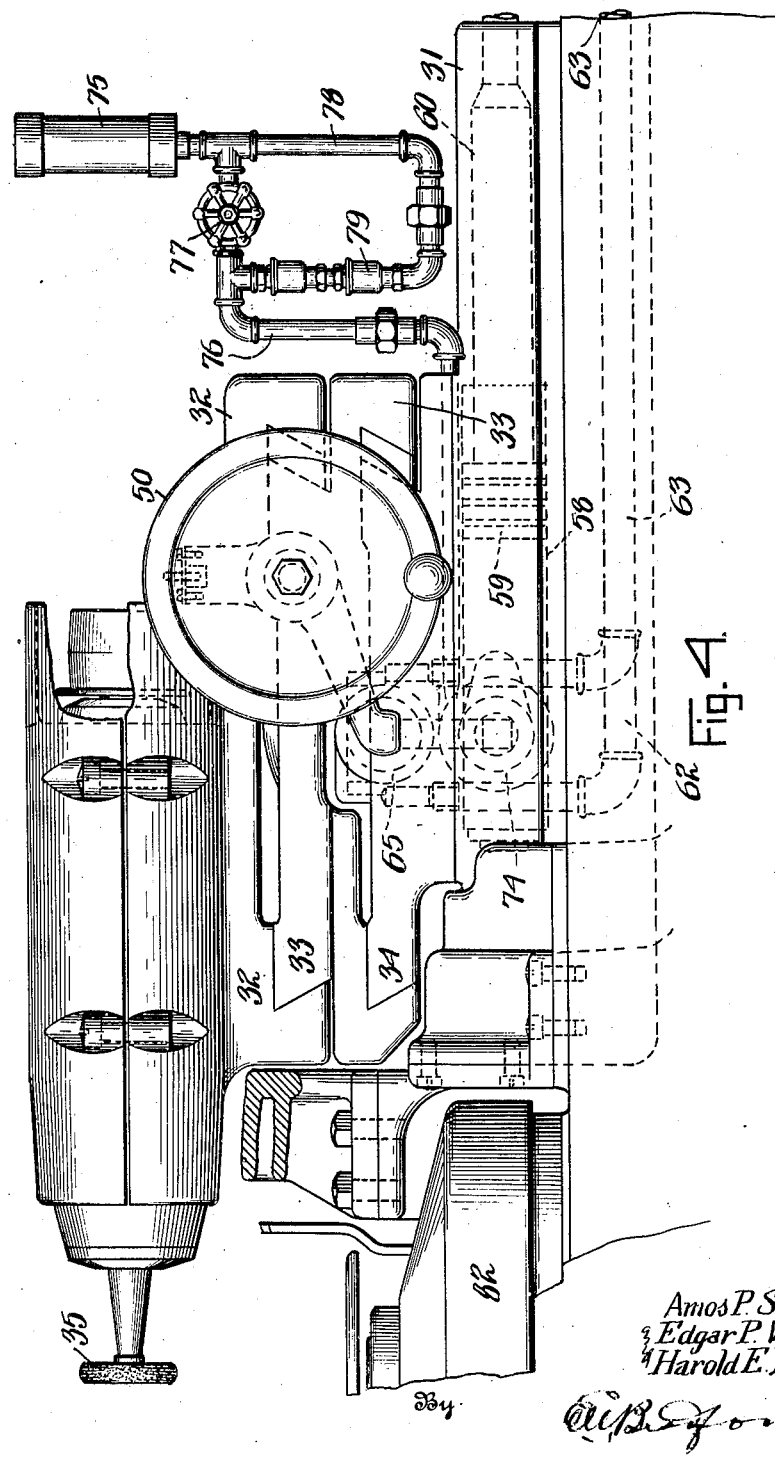
Figure 5:
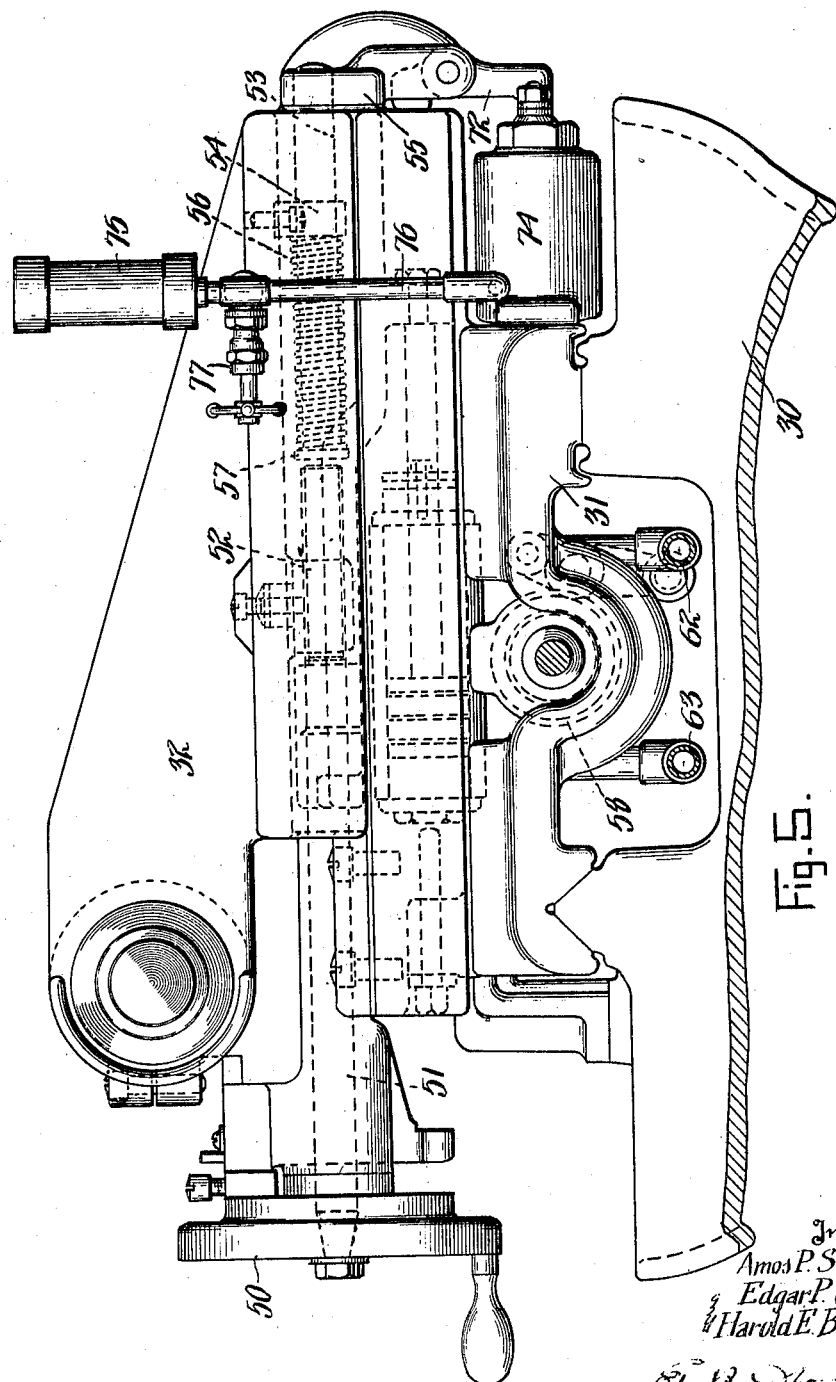
Figure 12:
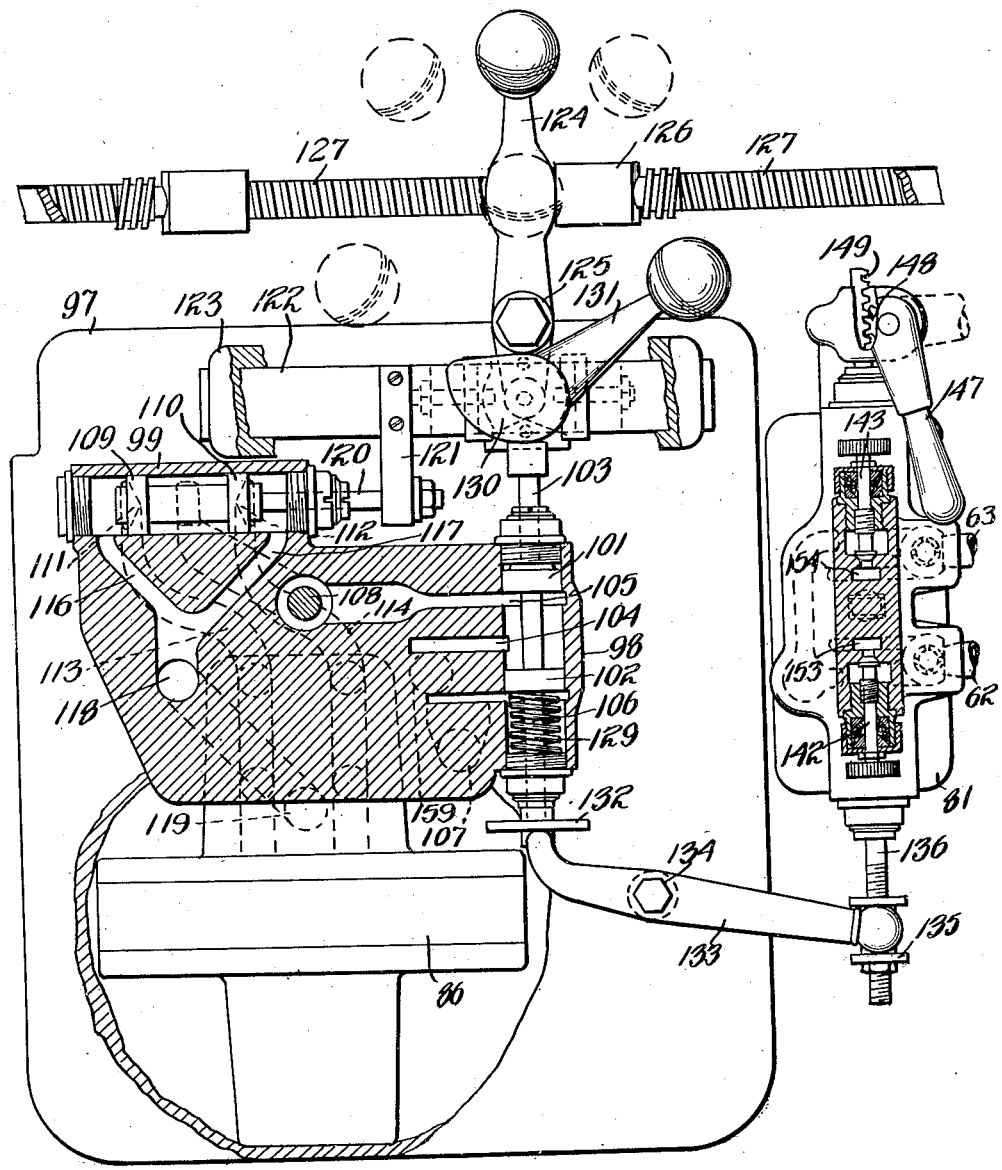
Figure 23:
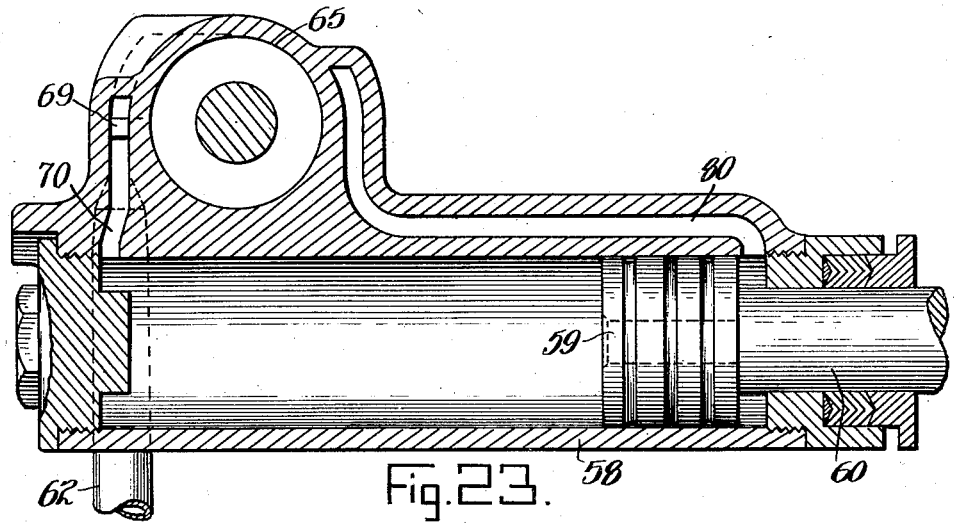
Figure 24:
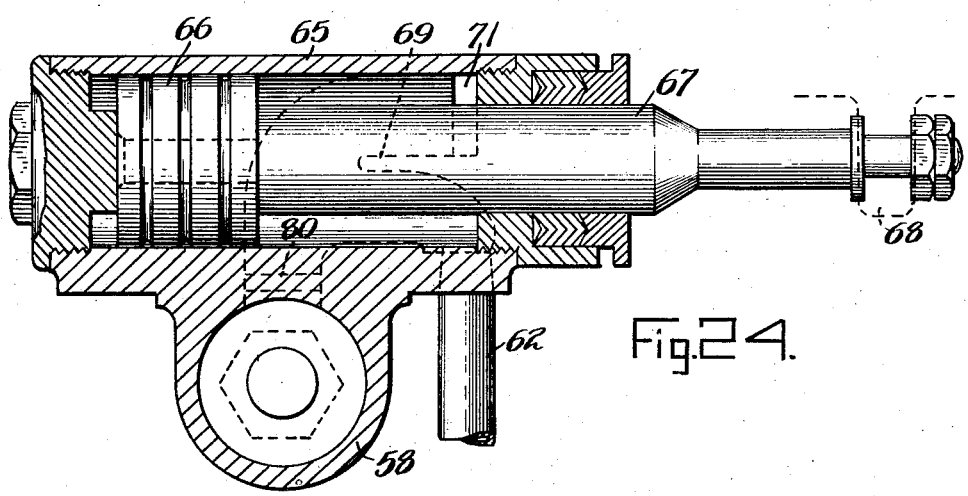

Referring to the accompanying drawings, which are made a part hereof and on which similar reference characters indicate similar parts, Figure 1 is a front elevation of the machine, Figure 2 is an end elevation of the machine, Figure 3 is a plan view of the machine, Figure 4 is a front elevation of the wheel base showing operating cylinders and fluid conduits thereto in outline, Figure 5 is an end elevation of the wheel base, Figure 6 is a front elevation of the wheel carriage driving cylinder, Figure 7 is an end elevation showing the wheel base driving cylinder, Figure 8 is a front elevation of head stock assembly, Figure 9 is a right-hand end elevation of the head stock with the chuck removed, being substantially a view of Figure 8 as viewed from the right, Figure 10 is a sectional end elevation of the oscillating mechanism, taken substantially on line 10—10 of Figure 1, Figure 11 is an end elevation of the control valve assembly, Figure 12 is a front elevation partly in section of the control valve assembly and the oscillatory reversing mechanism, Figure 13 is a section on line 13—13, of Fig. 15, Figure 14 is a front section of the auxiliary control valve taken on line 14—14 of Figure 16, Figure 15 is an end section of the auxiliary control valve taken on line 15—15 of Figure 16, Figure 16 is a plan view of the auxiliary control valve, Figure 17 is a section on line 17—17 of Figure 16 showing the arrangement of the needle valves and the check valves, Figure 18 is a view showing the position of the head stock for grinding races for end thrust bearings, Figure 19 shows the position of the head stock for grinding inside races for ball bearings, Figure 20 shows the position of the head stock for grinding outside races for ball bearings and also the path followed by the grinding wheel in moving from inoperative position to diamonding position or to working position, Figures 18a, 19a and 20a are perspective views of the work on an enlarged scale corresponding to that shown in Figures 18, 19 and 20, respectively, Figure 21 is a front elevation of the wheel truing device, Figure 22 is an end elevation of the wheel truing device, Figure 23 is a longitudinal sectional view of the wheel carriage cylinder, Figure 24 is a longitudinal section of the wheel base operating cylinder, and Figure 25 is a diagrammatic view showing the hydraulic system.

In a co-pending application Serial No. 389,492, filed August 30, 1929, there is shown, described and claimed a grinding machine for grinding the internal surface of a work piece wherein the grinding wheel is moved by hydraulic means axially into the work piece at a rapid rate and then transversely into grinding position. In this type of machine, the work piece must be rotated and oscillated during grinding. The present invention has particularly to do with the means which rotates and oscillates the work piece. This is accomplished by mounting the work holder on the head stock so that it may be rotated and the head stock on the shaft for oscillating the same, and the motor which oscillates the head stock is mounted directly on this shaft so that there is no lost motion or back lash during the oscillating of the head stock. The motor for oscillating the head stock is a hydraulic motor, and means is provided whereby the extent of oscillation of the motor can be varied. Furthermore, means is provided whereby the rate of oscillation may be varied and one may be varied independently of the other.

In the drawings reference character 30 indicates the bed of a grinding machine having a longitudinally movable wheel carriage 31 mounted in guideways thereon. A wheel base 32 is mounted to slide on a wheel base slide 33 which in turn is mounted on a sub-slide 34 on the wheel carriage 31. The wheel base and the wheel base slide are mounted to slide transversely of the wheel carriage. A grinding wheel 35 is mounted on a shaft rotatably mounted in the wheel base 32 and is driven by means of a belt 36 from a pulley 37, the pulley 37 being in turn driven by means of a belt 38 on a pulley 39 on the end of the shaft of a motor 40 (see Figures 1 to 3).

As shown in Figure 1, a head stock 41 is mounted to move transversely of a support 42 in guideways 43. The support 42 may be moved longitudinally of a table by means of an adjusting screw 44. A head stock spindle mounted in the head stock carries a work chuck 45 in its forward end in which chuck is mounted the work 47. The work is covered by a guard 46. The work is rotated by means of a fluid motor 48 driven by pressure fluid delivered thereto through a pipe 49, the details of all of which will be more fully presented as the description proceeds.

The means for moving the wheel carriage longitudinally of the bed of the machine and for moving the wheel base transversely of the bed of the machine will now be described (Fig. 5). The wheel base 32 is slidably mounted on the sub-slide 33 and is actuated by means of a hand wheel 50 mounted in a bracket on the said slide. The hand wheel is secured on the front end of a shaft 51 which is threaded at its other end for engagement with a nut 52 secured to the under side of the wheel base 32. Means associated with the wheel base operating mechanism provides for taking up back-lash between the shaft 51 and the wheel base 32. This consists of a pin 53 slidably mounted in a bracket 54 and fixed in a bracket 55 attached to the rear end of slide 33. A spring 56 on the said pin between the bracket 54 and a head 57 on the said pin exerts a force tending to slide wheel base 32 toward rear of slide 33 thus taking up back-lash between the threaded shaft and the nut 52.

The wheel carriage 31 is chambered to provide a cylinder 58 having a piston 59 movable therein (Figs. 3, 4, 6 and 23). A piston rod 60 is secured to the piston 59 at one end and at the other end to a bracket 61 on the bed of the machine so that when pressure fluid enters the cylinder 58 the cylinder moves and the piston remains stationary. It should be noted that the piston rod 60 is relatively large so that the surface area on the piston 59 at the right of the piston is relatively small so that the pressure fluid acting on this side will be considerably less than that on the left or front side of the piston 59. Pressure fluid is delivered to the cylinder 58 through fluid lines 62 and 63 (Figures 1 to 7, 23 and 24). Admission of fluid to and from lines 62 and 63 is controlled by a valve 81 (Fig. 1), the details of which will be described later. The wheel carriage 31 is also chambered to provide a cylinder 65 in which a piston 66 is mounted having a piston rod 67 which is attached at its outer end to a lug 68 on the wheel base (Figures 4, 7, 23 and 24).

A baffle plate 69 in the line 62 directs fluid first into the cylinder 58 through passage 70. Fluid from line 62 also goes to the cylinder 65 through passage. The purpose of the baffle plate is to cause pressure fluid to act more quickly in the cylinder 58 than in the cylinder 65. When the grinding wheel is to be withdrawn pressure fluid is directed through the line 63 directly into cylinder 65 and into cylinder 58 through the passage 80. Since the pressure fluid acts first on the larger area on the front side of the piston 59 in the cylinder 58 the grinding wheel carriage is first moved to position the grinding wheel within the work and then the wheel base is moved to place the grinding wheel in contact with the work, since the area at the right of the piston 66 in cylinder 65 is much less than the area on the face of the piston 59 in cylinder 58. An arm 72 is pivoted on a bracket 55 on the wheel base and one end of the arm engages the sub-slide 34 and the other end engages the end of a piston rod of the hydraulic feed regulator 74 (Figures 4 and 5). From the construction of the pivoted arm 72 it will be seen that the feed regulator moves a greater distance than the wheel support. This construction increases the accuracy of the feed in proportion to the relative lengths of the distance from the pivot point of the lever to each end. The feed regulator is of the well known dash pot type. A pipe 76 is connected to the front end of the cylinder and connects through needle valve 77 with the reservoir 75. A pipe 78 also connects reservoir 75 with pipe 76. Pressure fluid is forced from the cylinder on the inward movement of the slide and passes through the pipe 76 and needle valve 77 to reservoir 75. Check valves 79 prevent said fluid from going any way except through the needle valve. On the return movement of the slide pressure fluid is drawn from the reservoir through the pipe 78, check valves 79 into the line 76 and thence into the cylinder 74. The rate with which the wheel base may be moved toward the work is controlled by adjustment of the needle valve 77 which restricts the flow of fluid from the cylinder 74 into the reservoir 75. To withdraw the grinding wheel base and the grinding wheel carriage, fluid is delivered through line 63 to the left of piston 66, a part of the fluid passing through line 80 to the right of piston 59. The fluid acting on a greater surface area on piston 66 than on piston 59 first moves the wheel base back and then moves the wheel carriage 31 to the right. Admission of fluid to the cylinders 58 and 65 is controlled by a valve assembly 81 shown at the right of Figure 12 and in Figures 14 and 15, details of which valve will be more fully described as the description proceeds. From the preceding description it can be seen that such a structure is of great value in grinding ball races or other internal work having a plurality of inside diameters in which the tool must first pass through a portion of minimum diameter before it may reach a position from which it may be advanced to grind a portion of greater diameter. The sequence of movements described is necessary to grind this type of work and the structure disclosed above provides this sequence automatically by fluid under pressures.

*Head stock assembly*

The head stock support 42 is mounted to slide in guide ways 87 on a table 82. This table has an annular depending V-shaped ridge which fits into a corresponding groove in the bed of the machine so that the table may rotate or oscillate on the bed. A hollow spindle 84 is secured at its top in the table and extends down vertically through the bed of the machine, being rotatably supported in bearings 85 on the bed of the machine. The lower end of the spindle extends into the casing of a motor 86 and has the motor propeller 88 secured thereon. The motor casing has suitable packing 89 to prevent leakage of fluid past the spindle 84 which spindle is a shaft on the motor propeller 88. The motor 86 is any suitable oscillating motor preferably of the type which has blades which have fluid-tight fit within the casing. The spindle 84 is hollow to provide a fluid conduit 90 to which a pipe 91 is connected at the lower end and which has a radial port 92 at its upper end to which the fluid conduit 49 is connected. At its upper end the spindle also has an axial bore 93 which has a radial bore 94 at its upper end. This radial bore is connected with a flexible conduit 95 connected to the exhaust passage of the motor 48. A radial bore 96 at the lower end of the bore 93 permits exhaust from the motor to drop into the base of the machine (Figs. 9 and 10).

The means for oscillating the head stock assembly just described will now be described. This consists of a valve assembly 97 which will be hereinafter referred to as the control valve assembly and consists of a start and stop valve 98 and a reversing valve 99. The details of these valves are best given in Figures 12 and 25.

The reversing valve 99 is used to control the operation of the oscillating motor 86. The motor 86 may be of any well known type of oscillating motor having blades which have a fluid tight fit within a casing. Pressure fluid is delivered from a pump 100 to the valve assembly. A pair of spaced disks 101 and 102 operating on a valve stem 103 control passage of fluid from inlet port 104 to line 105 to the reversing valve 99 and to port 106 to exhaust line 107, respectively. A needle valve 108 controls passage of fluid through line 105 to the valve chamber 99. Valve disks 109 and 110 control passage of fluid from the line 105 to ports 111 and 112 which connect with fluid lines 113 and 114 respectively to the oscillating motor 86. The exhaust from the motor 86 passes through the passage 116 or 117 to passage 118 which passes through the motor casing and has an exhaust line 119 connected thereto. The valve disks 109 and 110 which control admission of fluid to the oscillating motor are shifted in the following manner. A valve stem 120 to which the disks 109 and 110 are connected is connected by an arm 121 to a bar 122 slidable in a bracket 123. A lever 124 is pivoted upon the valve casing at 125 and has its lower end in engagement with the bar 122 so that movement of the lever will slide the bar in the brackets 123 in which it is mounted. The reversing lever 124 is actuated by dogs 126 adjustably mounted on sliding dog rack 127. The dog rack 127 is slidably mounted in the base of the machine and is operated by a segmental gear 128 which is secured to the oscillating spindle 84. It will readily be seen from the description so far given that as the shaft 84 nears one extreme of its oscillation one of the dogs 126 will strike the lever 124 to shift the valve disks 109 and 110 to change the direction of fluid into the motor 86 to reverse the motor. A compression spring 129 is positioned beneath the lower valve disk 102 to hold the valve normally in the elevated position in which it is shown in Figure 12. In this position fluid may pass from the inlet 104 through the valve chamber to the fluid passage 105. The valve stem 103 is operated by means of a cam 130 on the lower end of a lever 131. This cam is pivoted in a part of the bracket 123 which is broken away to better reveal its parts. When the lever 131 is in its extreme left position the valve disk 102 is depressed to its lowermost position so that pressure fluid may enter the said valve through 104, pass through port 106 and return through line 107 to a reservoir in the base of the machine, not shown. When in this position pressure fluid is by-passed from the pump and none of the elements of the head stock are operating. When the lever 131 is in the vertical position the port 106 is closed and port 105 is cut off from the port 104 so that pressure fluid can neither be by-passed nor pass to the oscillating motor 86. Pressure fluid, however, may continue to pass to pipe 91 and to the work drive motor 43 as will later appear. The lower end of the stem 103 has a disk 132 secured thereon which disk engages one end of a lever 133. The lever 133 is pivoted at 134 to the valve casing and has its free end in engagement with a spool 135 on the lower end of a rod 136.

As best shown in Figures 14, 15 and 25 a valve 137 comprising a pair of spaced disks 138 and 139 is mounted in the valve chamber 140 and slidably mounted on the upper end of the rod 136. The valve disks 138 and 139 control passage of fluid from pressure fluid line 141 to line 62 and 63, passage of fluid to the lines 62 and 63 being controlled by needle valves 142 and 143 respectively. An exhaust line 144 conducts fluid back to a reservoir in the base of the machine. The valve 137 is held in balanced position between springs 145 and 146. The spring 146 is positioned between the disk 138 and the upper end of the chamber 140 and the spring 145 is positioned between the disk 139 and a collar on the rod 136. Operation of the lever 131 will therefore control admission of fluid to the wheel base and wheel carriage motors to operate them. The valve 81 which will hereafter be referred to as the auxiliary valve is mounted on the bed of the machine adjacent the main control valve 97, and controls only movements of the wheel base and the wheel carriage. When the work is being ground on the machine this valve is operated in conjunction with the main control valve through the lever mechanism 133 just described. When the grinding wheel, however, needs dressing it is not necessary to oscillate the head stock or to drive the work drive motor. Mechanism is therefore provided for controlling the valve 81 independently of the main control valve i. e. independently of the lever 131. Mounted on the auxiliary valve 81 is a lever 147. This lever is secured on a shaft which has a gear segment 148 which engages teeth 149 on a rack 150. The rack 150 is integral with or has on its lower end a pair of operating fingers 151 which move freely in a guide 152 on the rod 136. The fingers 151 are free to move on the guide 152 when the rest of the machine is in operation. This is the condition in which the parts are shown in Figures 12, 14 and 15. The valve 137 is slidably mounted on the rod 136 which is operated by the main control valve through the lever 133 and is held in position between springs 145 and 146. Pressure fluid enters the valve chamber through the line 141 and port 153 from which it is directed through ports 154 or 155 to lines 63 or 62 depending on the position of the valve 137 and is delivered to the wheel base and wheel carriage cylinders. The needle valves 143 and 142 control passage of fluid to lines 63 and 62 respectively. A spring pressed check valve 155 is positioned in a bore connecting port 155 and line 62 to permit fluid to flow freely from line 62 to port 155, and a similar check valve 157 is positioned between port 154 and line 63 (Fig. 25)

In the position shown, pressure fluid enters the valve and is directed through port 153, needle valve 142 to the pipe 62 through which it is conducted to the cylinders 58 and 65 to move them into operative position to bring the grinding wheel within the work and in grinding contact with the work. When the operating lever 131 is in the extreme left of the position, the disks 101 and 102 of the start and stop valve are in position to bypass pressure fluid from port 104 to 106 which would otherwise pass to the reversing valve 99 and the work drive motor. With the main control valve in this position, the auxiliary valve 137 is in the top position and the wheel carriage and the wheel base will be withdrawn to inoperative position. In order to bring the grinding wheel to dressing position the lever 147 must be moved to the dot and dash line position 158 shown in Figure 14, in which position the valve 137 is moved down to operative position sliding on the rod 136 against the action of spring 145.

As shown in Figures 1, 25 and 12 a single fluid conduit 159 supplies pressure fluid to the main control valve 97 and a branch 160 of this line leads to the work drive motor. Pressure fluid entering through control valve assembly through passage 104 may be directed either to the oscillating motor 86 through the reversing valve 99 or it may be by-passed through port 106 and passage 107 depending on the position of the valve disks 101 and 102. If the by-pass is open all the fluid coming through the pipe 159 is returned to the reservoir. If the fluid is directed to the reversing valve it is placed under pressure and a part of it passes through passage 160 and 90 to the work drive motor 48. With this arrangement the work head cannot oscillate without the work drive motor operating. The work drive motor, however, may rotate without the oscillating motor by shifting the lever 131 to vertical position so that the valve disks 101 and 102 close off ports 104 and 105, but do not open by-pass port 106, allowing the fluid to pass out of the valve assembly through the work drive motor in order to operate this motor. Adjustable pressure relief valves 161 and 162 may be positioned in the pressure lines 159 and 141 from the pump 100.

*Wheel dressing mechanism*

The wheel dressing mechanism is shown best in Figures 21 and 22 and consists of a bracket 163 secured to a bracket 164 which latter bracket is secured to the bed of the machine. An arm 165 is pivotally mounted on the bracket 163 so as to be permitted to swing forward to place a dressing tool 166 in position to dress the grinding wheel 35. The bracket 163 has a positive stop 167 which is engaged by an adjustable stop 168 on the arm 165. This enables the operator to position the dressing tool in exact operative position. A clamp 169 holds the tool in any position in which it may be set. The dressing tool 166 is held in an arm 170 which is pivotally mounted on the end of the arm 165 and may be rotated by an arm 171 so as to give a curved face to the grinding wheel 35 which is being dressed. A connecting rod 172 is attached to the arm 165 by a stud 173. The other end of the connecting rod is connected to an arm 174 which is pivoted at 175 and carries a resilient stop 176. This stop has a reduced portion 177 and is slidably mounted in a hollow drilled in the arm 174 to provide a running fit for both diameters of the said stop. A spring 178 is mounted on the reduced portion of the stop. A pin 179 limits the action of the spring 178. An adjustable stop 180 serves to limit the movement of the wheel carriage whether it is moving to working position or dressing position. When the diamond is dropped into position for dressing the stop 176 is raised by means of the connecting rod 172 and the arm 174 so that it rests directly in the path of the wheel carriage 31. A hardened block 181 is inserted in said carriage to engage the stop. As the carriage engages the stop the stop is moved against the action of the spring 178 until it engages adjustable stop 180. The carriage is thus stopped so that the grinding wheel is in correct position for dressing. The length of the stop 176 is the same as the distance from the center of the groove in the work piece to the center about which the dressing tool rotates. A pin 182 extends down through arm 165 on the same axis about which the diamond rotates. This pin has a plurality of diameters 183 adjacent the diamond 166. The diamond may therefore be set for a given radius by adjusting it to engage any one of the desired shoulders 183 which represent different diameters of the pin 182.

A coolant pump 184 driven by a belt 185 from the motor 46 delivers cooling fluid through a flexible conduit 186 and through the head-stock spindle 29 to the interior of the work 47. A reversing valve 83 (Fig. 25) is positioned in the fluid line 49 and enables the operator to rotate the work 47 in either direction. The speed of the fluid motor 48 is controlled by means of a needle valve 187.

As will be seen from the structure described the single lever 131 controls the oscillating motor 86 for the head-stock support and the work rotating motor 48. It likewise controls movement of the work carriage and the wheel base into and out of operative position. It will therefore be seen that the single lever provides a convenient control for all of the mechanism necessary during a grinding operation. When it is desired to dress the grinding wheel, this may be done by operating another lever which controls the movement of the wheel base and the wheel carriage into wheel dressing position without affecting the operative mechanism for the head-stock assembly. It will therefore be seen that by providing mechanism for controlling the machine by means of a single lever operation of the machine is greatly simplified thus requiring less attention on the part of the operator and allowing him to give more of his thought to other things and even to operate more than a single machine at a time. The wheel dressing mechanism moreover insures positioning the grinding wheel in exact position to be dressed with the least possible loss of time.

It will be obvious to those skilled in the art that various changes may be made in our device without departing from the spirit of the invention and therefore we do not limit ourselves to what is shown in the drawings and described in the specification but only as indicated in the appended claims.

Having thus fully described our said invention, what we claim as new and desire to secure by Letters Patent, is:

1. A grinding machine, having a head-stock support, a head-stock mounted on the support, means for oscillating the head-stock support, and means for rotating the head-stock, a grinding wheel, means for moving the grinding wheel axially and transversely of the head-stock, all of said means being fluid operated and a single control lever for controlling operation of all of the said means, and independent control means for causing the grinding wheel to move axially of the work to position the grinding wheel in wheel dressing position, substantially as set forth.

2. A grinding machine having a head-stock support, a head-stock mounted on the support, means for oscillating the head-stock support, and means for rotating the head-stock, a grinding wheel, means for moving the grinding wheel axially and transversely of the head-stock, fluid pressure means for operating all of said means, a single control lever for controlling operation of all of the said means, independent control means for causing the grinding wheel to move axially of the work to position the grinding wheel in wheel dressing position, and resilient means for stopping movement of the work carriage in wheel dressing position, substantially as set forth.

3. In a grinding machine for ball races, a head-stock, means for rotating the head-stock, means for oscillating the head-stock, a single valve for controlling the head-stock rotating and the head-stock oscillating means, a lever for controlling said valve, the said lever operating in one position to permit rotation of the head-stock without oscillating it, substantially as set forth.

4. In a machine for grinding ball races, a base, a wheel support mounted thereon, a head-stock support, a head-stock mounted thereon, means for moving the wheel support in two directions at right angles to each other on the support, means for rotating the head-stock, means for oscillating the head-stock, a valve for controlling the operation of the rotating and oscillating means, another valve positioned adjacent said valve, operative connection between the two valves whereby operation of one valve operates the other to control movement of the wheel support into grinding position, substantially as set forth.

5. In a grinding machine, a head-stock, a wheel carriage, a wheel base movable transversely of the wheel carriage, pressure fluid means for rotating the head-stock, separate pressure fluid means for oscillating the head-stock, pressure fluid means for moving the wheel carriage axially of the head-stock, separate pressure fluid means for moving the wheel base transversely of the wheel carriage, a valve for controlling rotation and oscillation of the head-stock, a second valve for controlling movement of the wheel carriage and the wheel base, operative connection between the first and the last-named valve whereby operation of one will operate the other, substantially as set forth.

6. In a grinding machine, a head-stock, a wheel carriage and a wheel base, pressure fluid means for rotating the head-stock and for oscillating it, pressure fluid means for moving the wheel carriage axially of the head-stock, additional pressure fluid means for moving the wheel base transversely of the wheel carriage, a valve for controlling rotation and oscillation of the head-stock, a valve for controlling movement of the wheel carriage and the wheel base, the said last-named valve being operated by the first-named valve, and independent means for operating the last-named valve whereby the wheel carriage and the wheel base may be operated when the head-stock oscillating and rotating means are inoperative, substantially as set forth.

7. A grinding machine comprising a base, a wheel carriage movable longitudinally of said base, a wheel base movable transversely of the wheel carriage, a grinding wheel rotatably mounted in the wheel base, a head-stock having means for oscillating and rotating the same, and a wheel dressing mechanism movable into position to dress the grinding wheel, means for controlling oscillation and rotation of the head-stock, means for controlling movement of the wheel carriage and the wheel base, said last-named means being controlled by the first-named means, and independent means for causing movement of the wheel carriage and the wheel base to position the grinding wheel adjacent the wheel dressing means, substantially as set forth.

8. In a machine for grinding ball races, a bed, a wheel carriage and wheel base mounted thereon and movable longitudinally and transversely of said bed, a head-stock, means for rotating the head-stock, means for oscillating the head-stock, the last-named means comprising a spindle vertically mounted in the said bed and attached to the said head-stock, a fluid motor for driving said spindle, a valve for directing pressure fluid to oscillate said fluid motor to oscillate the head-stock, a fluid conduit through said spindle for supplying pressure fluid to the head-stock rotating motor, the said valve operating in one position to cut off fluid from the said oscillating motor and the said work rotating motor and in another position to cut off motive fluid only from the oscillating motor but to permit the work rotating motor to continue to operate, substantially as set forth.

9. In a grinding machine, a base, a head-stuck, a wheel carriage movable longitudinally of said base and axially of said head-stock, a wheel base movable transversely of the wheel carriage, a wheel dresing mechanism mounted on said base and movable into the path of the said wheel, an arm on said wheel dressing mechanism having a stop secured thereon said stop being positioned in the path of the wheel carriage when the dressing tool is moved to position to dress the grinding wheel, and means for moving the wheel carriage and the wheel base into position for placing the grinding wheel in the wheel dressing position, substantially as set forth.

10. In a machine for grinding ball races, a bed, a wheel carriage and wheel base mounted thereon and movable longitudinally and transversely of said bed, a head stock, means for rotating the headstock, means for oscillating the headstock, the last-named means comprising a spindle vertically mountel in the said bed and attached to the said headstock, a fluid motor for driving said spindle, a valve for directing pressure fluid to oscillate said fluid motor to oscillate the headstock, a fluid conduit through said spindle for supplying pressure fluid to the headstock rotating motor, substantially as set forth.

11. A grinding machine comprising a head stock, a grinding wheel, a grinding wheel carriage movable toward and from said head stock, means for moving said wheel carriage, a hydraulic feed regulator having a movable element thereon for limiting said movement, and means mounted on said carriage and operably engaging said movable element for causing said wheel carriage to move toward the work at a slower rate than the movement of said regulator whereby any errors in the regulator will be decreased in the movement of the wheel carriage, substantially as set forth.

12. A grinding wheel comprising a work support, a wheel support, a wheel slide, a fluid motor for moving one of said supports toward the other, a hydraulic feed regulator having a moving element for controlling movement of said support, a lever pivoted upon said wheel support having one end engageable with said movable element and the other end engageable with said wheel slide, said lever forming operative connection between the regulator and the wheel support and operating to reduce the movement of the wheel support with respect to movement of the regulator, substantially as set forth.

13. A grinding machine comprising a bed, a work support, a grinding wheel support, means for moving said supports relative to each other, an oscillating shaft mounted in said bed, said work support being mounted on said shaft, and an oscillating fluid motor mounted directly on said shaft for oscillating said work support, substantially as set forth.

14. A grinding wheel for ball races comprising a work support, a grinding wheel support, means for feeding said supports toward each other and in paths at right angles to each other, means for rotating the work, means for oscillating the work support comprising a shaft having a work support mounted thereon, and an oscillating fluid motor directly connected to said shaft for oscillating said work support, substantially as set forth.

15. In a grinding machine, a wheel support, a work support, means to provide relative transverse and axial movement between said supports, comprising a reciprocating piston and cylinder type of motor for effecting each movement, one side of each of said pistons presenting a greater area than the other to the action of the fluid pressure, and means to direct fluid pressure to the small area of one and the large area of the other at the same time, substantially as set forth.

16. A grinding machine comprising a bed, a wheel carriage mounted thereon, a wheel base movable transversely of said wheel carriage, a grinding wheel rotatably mounted upon the wheel base, a fluid motor for moving said wheel carriage longitudinally of the said bed, a separate fluid motor for moving said wheel base transversely of the wheel carriage, means whereby the motor for moving the carriage longitudinally of the bed first acts to move the wheel to the limit of its travel longitudinally of the bed and then operates the second motor to move the wheel base transversely of the wheel carriage to move the grinding wheel to grinding position, a work support, a head stock rotatably mounted upon the work support, a fluid motor for rotating the head stock, a separate fluid motor for oscillating the work support, a valve in control of all of said means, said valve controlling operation of the work support oscillating motor and the head stock rotating motor in a predetermined sequence of operations relative to the movements of the wheel carriage and the wheel base.

AMOS P. STEINER.
EDGAR P. WINE.
HAROLD E. BALSIGER.